(12) United States Patent
Kim et al.

(10) Patent No.: US 8,744,031 B1
(45) Date of Patent: Jun. 3, 2014

(54) DEVICE AND METHOD FOR ESTIMATING CARRIER FREQUENCY OFFSET OF OFDM SIGNALS TRANSMITTED AND RECEIVED THROUGH PLURALITY OF POLARIZED ANTENNAS

(71) Applicant: Electronics and Telecommunications Research Institute, Daejeon-si (KR)

(72) Inventors: Jun-Woo Kim, Daejeon-si (KR);
Young-Jo Bang, Daejeon-si (KR);
Kyung-Yeol Sohn, Daejeon-si (KR);
Se-Young Cho, Daejeon-si (KR);
Youn-Ok Park, Daejeon-si (KR)

(73) Assignee: Electronics and Telecommunications Research Institute, Daejeon-Si (KR)

( * ) Notice: Subject to any disclaimer, the term of this patent is extended or adjusted under 35 U.S.C. 154(b) by 0 days.

(21) Appl. No.: 13/965,652

(22) Filed: Aug. 13, 2013

(30) Foreign Application Priority Data

Dec. 10, 2012 (KR) .......................... 10-2012-0142894

(51) Int. Cl.
*H04L 7/00* (2006.01)
(52) U.S. Cl.
USPC ........... 375/371; 375/347; 375/349; 375/260; 375/325; 375/346; 375/267; 343/756; 455/132; 455/500; 455/501; 455/506; 455/60; 455/63.1; 342/361; 342/188; 342/362
(58) Field of Classification Search
USPC ......... 375/371, 347, 349, 260, 325, 346, 267; 342/361, 188, 362; 500/132, 500, 501, 500/506, 60, 63.1; 343/756
See application file for complete search history.

(56) References Cited

U.S. PATENT DOCUMENTS

| 5,943,372 | A | * | 8/1999 | Gans et al. ..................... 375/347 |
| 6,704,374 | B1 | | 3/2004 | Belotserkovsky et al. |
| 6,862,297 | B1 | | 3/2005 | Gardner et al. |
| 2005/0190848 | A1 | * | 9/2005 | Kiyanagii et al. ............. 375/260 |
| 2008/0101496 | A1 | * | 5/2008 | Gaikwad ....................... 375/267 |
| 2011/0096855 | A1 | | 4/2011 | Youn et al. |

FOREIGN PATENT DOCUMENTS

| JP | 2001-274765 A | 10/2001 |
| KR | 10-2000-0072945 A | 12/2000 |
| KR | 10-2010-0076473 A | 7/2010 |
| KR | 10-2011-0044453 A | 4/2011 |

OTHER PUBLICATIONS

Jun-Woo Kim et al., "A Joint Frequency Offset Measurement Using Inversely Repeated Training Symbol and Cyclic Prefix", KICS, Jul. 2011, pp. 627-634, vol. 36, No. 7.
Henrik Asplund et al., "Propagation characteristics of polarized radio waves in cellular communication", IEEE Conference 2007, pp. 839-843, 2007.

* cited by examiner

*Primary Examiner* — Daniel Washburn
*Assistant Examiner* — Rahel Guarino
(74) *Attorney, Agent, or Firm* — Rabin & Berdo, P.C.

(57) ABSTRACT

Provided are a device and method for estimating carrier frequency offset of OFDM signals transmitted and received through a plurality of polarized antennas that may accurately estimate carrier frequency offset used for carrier frequency synchronization acquisition when there is interference between polarized waves.

9 Claims, 6 Drawing Sheets

DEVICE AND METHOD FOR ESTIMATING CARRIER FREQUENCY OFFSET OF OFDM SIGNALS TRANSMITTED AND RECEIVED THROUGH PLURALITY OF POLARIZED ANTENNAS

CROSS-REFERENCE TO RELATED APPLICATION

This application claims the benefit under 35 U.S.C. §119 (a) of Korean Patent Application No. 10-2012-0142894, filed on Dec. 10, 2012, in the Korean Intellectual Property Office, the entire disclosure of which is incorporated herein by reference for all purposes.

BACKGROUND

1. Field

The following description relates to technology for estimating carrier frequency offset of OFDM signals, and more particularly, to a device and method for estimating carrier frequency is offset of OFDM signals transmitted and received through a plurality of polarized antennas.

2. Description of the Related Art

FIG. 1 is an exemplary diagram illustrating a structure of a polarized antenna transceiver. As illustrated in FIG. 1, multiple polarized waves are simultaneously transmitted and received through a horizontally polarized antenna and a vertically polarized antenna. In FIG. 1, $H_{HH}$ is a channel transfer function between the horizontally polarized antenna of a transmitter and the horizontally polarized antenna of a receiver, $H_{VV}$ is a channel transfer function between the vertically polarized antenna of the transmitter and the vertically polarized antenna of the receiver, $H_{HV}$ is a channel transfer function between the horizontally polarized antenna of the transmitter and the vertically polarized antenna of the receiver, and $H_{VH}$ is a channel transfer function between the vertically polarized antenna of the transmitter and the horizontally polarized antenna of the receiver.

In an ideal environment having no reflected waves, horizontally polarized waves and vertically polarized waves transmitted from the transmitter do not interfere with each other, but in a real-world environment, cross-polarization discrimination (XPD) indicating a degree of interference between two polarized waves has a non-zero value. The XPD is defined as a ratio between two signals when a receiving antenna receives the two signals, one is transmitted in a wave polarized the same as the receiving antenna and the other is transmitted in a wave polarized opposite to the receiving antenna. When the XPD is not zero, it means that the two polarized waves interfere with each other during transmission. This means that the channel transfer functions $H_{VH}$ and $H_{HV}$ have non-zero values in FIG. 1.

Korean Laid-open Patent Application No. 10-2011-0044453 (Apr. 29, 2011) proposes technology that transmits a group of training symbol for each antenna in a non-overlapping manner in order to measure and compensate for the effect of the XPD when OFDM signals are transmitted through the polarized antenna.

FIG. 2 is an exemplary diagram illustrating a configuration of subcarriers of the training symbol for the polarized antenna. When the subcarriers of the training symbols of each polarized wave are arranged as illustrated in FIG. 2, a time domain value of the training symbol of each polarized wave has a repetition feature, and it can be used for carrier frequency synchronization acquisition.

Although the conventional methods can easily obtain carrier frequency synchronization acquisition in each polarized wave when there is no interference between polarized waves, that is, when the XPD value is zero, it is difficult for the conventional methods to obtain carrier frequency synchronization acquisition when there is interference between polarized waves, that is, when the XPD value is non-zero.

Therefore, the inventors studied about technology for accurately estimating carrier frequency offset used for carrier frequency synchronization acquisition when there is interference between polarized waves.

SUMMARY

The following description relates to a device and method for estimating carrier frequency offset of OFDM signals transmitted and received through a plurality of polarized antennas that can accurately estimate carrier frequency offset used for carrier frequency synchronization acquisition when there is interference between polarized waves.

In one general aspect, there is provided a device for estimating carrier frequency offset of OFDM signals transmitted and received through a plurality of polarized antennas, the device including a phase-shift calculating unit configured to calculate antenna phase shift values of OFDM signals respectively received from a plurality of polarized antennas due to interference between antennas, and an offset estimating unit configured to remove phase shifts due to interference between antennas from the antenna phase shift values due to interference between antennas calculated by the phase-shift calculating unit, remove an effect of fast fading, and estimate carrier frequency offset values.

The phase-shift calculating unit may include n phase delaying units configured to delay phases of a first half the OFDM signals respectively received from n polarized antennas, respectively, n first group multiplication units configured to respectively multiply a first half of phased-delayed OFDM signals respectively phase-delayed by the phase delaying units by a first half pattern of a training symbol known in advance, and n second group multiplication units configured to respectively multiply a second half pattern of non-phase-delayed OFDM signals by a second half pattern of the training symbol known in advance.

The offset estimating unit may include a first phase-shift removing unit configured to remove phase shifts due to interference between antennas by adding or subtracting values output from each of the n first group multiplication units, a second phase-shift removing unit configured to remove phase shifts due to interference between antennas by adding or subtracting values output from each of the n second group multiplication units, and a frequency component acquisition unit configured to acquire frequency components in which the effect of fast fading is removed by calculating the inverse tangent of signals output from the first and second phase-shift removing units.

The polarized antennas may include at least one vertically polarized antenna and at least one horizontally polarized antenna.

A subcarrier of the training symbol of each polarized wave may be alternately arranged as a subcarrier of the training symbol of another polarized wave.

The training symbol of each polarized wave may be repeated twice in one OFDM sequence, the first and second half patterns of the training symbol in the OFDM signals transmitted in one polarized wave may have the same phase, and the first and second half patterns of the training symbol in the OFDM signals transmitted in the other polarized wave may have opposite phases.

In another aspect, there is provided a method of estimating carrier frequency offset in a device for estimating carrier frequency offset of OFDM signals transmitted and received through a plurality of polarized antennas, the method including delaying phases of a first half of the OFDM signals received through each of n polarized antennas, multiplying a first half of n phase-delayed OFDM signals by a first half pattern of a training symbol known in advance, and a second half of n non-phase-delayed OFDM signals by a second half pattern of the training symbol known in advance, calculating a first value by adding or subtracting values that are calculated by multiplying the first half of the n phase-delayed OFDM signals by the first half pattern of the training symbol known in advance, and calculating a second value by adding or subtracting values that are calculated by multiplying the second half of the n non-phase-delayed OFDM signals by the second half pattern of the training symbol known in advance, and estimating a carrier frequency offset value by acquiring frequency components in which the effect of fast fading is removed by calculating the inverse tangent of the first and second values.

When the OFDM training symbol is transmitted and received through the plurality of polarized antennas, properties of repetition features are changed due to interference between the horizontally and vertically polarized waves. According to the invention, carrier frequency offset is estimated using this training symbol so that carrier frequency offset used for carrier frequency synchronization acquisition is accurately estimated when there is interference between polarized waves.

Other features and aspects will be apparent from the following detailed description, the drawings, and the claims.

Figure 1:
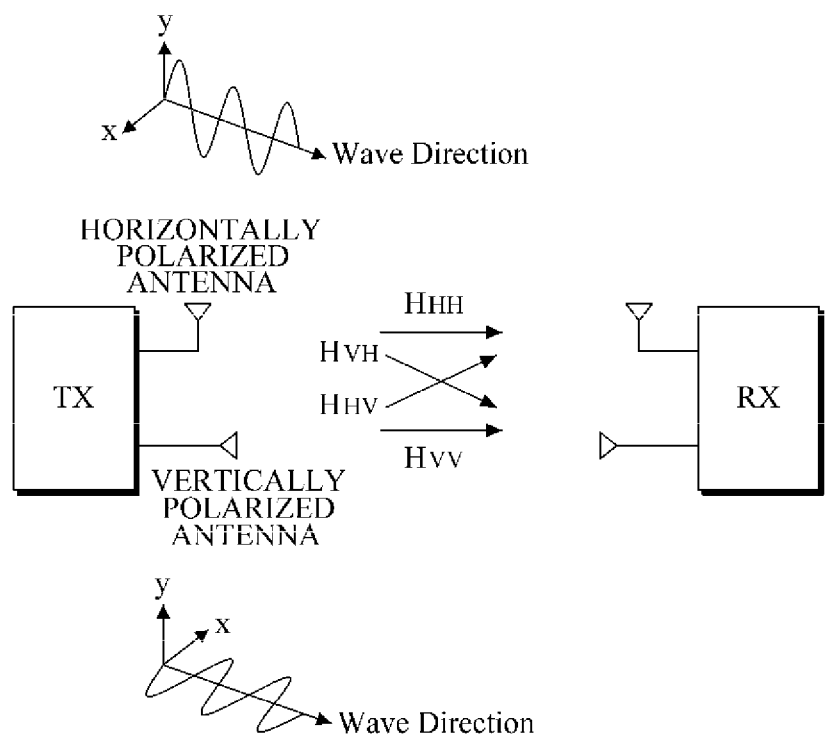
FIG. 1 is an exemplary diagram illustrating a structure of a polarized antenna transceiver.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. Also, descriptions of well-known functions and constructions may be omitted for increased clarity and conciseness.

Hereinafter, in order to facilitate understanding and reproduce by those skilled in the art, the present invention will be described in detail by explaining exemplary embodiments with reference to the accompanying drawings.

When it is determined that detailed explanations of related well-known functions and configurations unnecessarily obscure gist of the embodiments, the detailed description thereof will not be repeated.

The terminology used herein is defined by considering a function in the embodiments, and meanings may vary depending on, for example, a user or operator's intentions or customs. Therefore, the meanings of terms used in the embodiments should be interpreted based on the scope throughout this specification.

Figure 3:
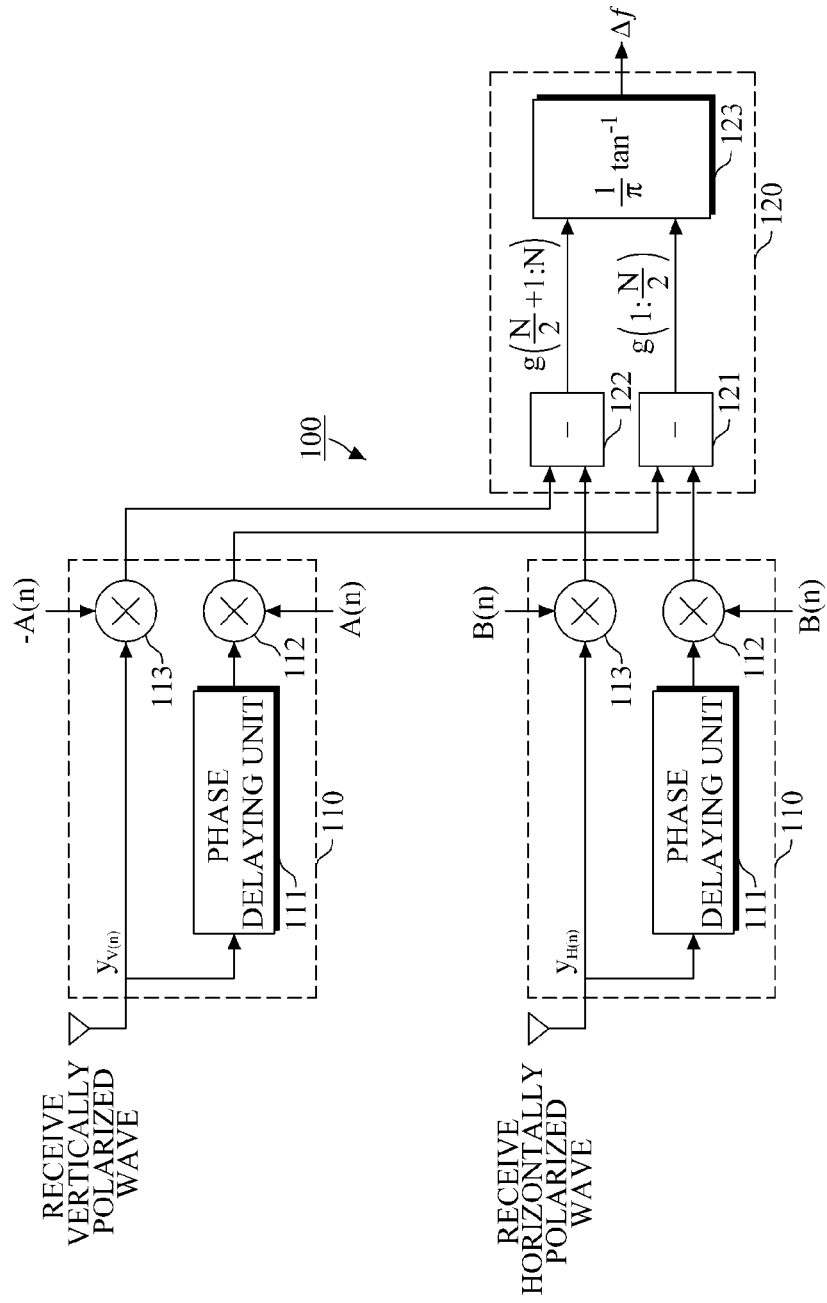
FIG. 3 is a block diagram illustrating a configuration of a device for estimating carrier frequency offset of OFDM signals transmitted and received through a plurality of polarized antennas according to an embodiment of the invention.

FIG. 3 is a block diagram illustrating a configuration of a device for estimating carrier frequency offset of OFDM signals transmitted and received through a plurality of polarized antennas according to an embodiment of the invention. As illustrated in FIG. 3, a device 100 for estimating carrier frequency offset according to the embodiment includes a phase-shift calculating unit 110 and an offset estimating unit 120.

The phase-shift calculating unit 110 calculates antenna phase shift values of OFDM signals respectively received from a plurality of polarized antennas due to interference between antennas. In this case, the polarized antennas may include at least one vertically polarized antenna and at least one horizontally polarized antenna. Meanwhile, the phase-shift calculating unit 110 may include n phase delaying units 111, n first group multiplication units 112, and n second group multiplication units 113.

The n phase delaying units 111 delay phases of a first half of the OFDM signals received through each of the n polarized antennas, respectively. When the OFDM signals are received through each of the n polarized antennas, in order to calculate antenna phase shifts of the OFDM signals received through each of the plurality of polarized antennas due to interference between antennas, the n phase delaying units 111 delay phases of the first half of the OFDM signals received through each of the n polarized antennas, respectively.

The n first group multiplication units 112 multiply the first half of the OFDM signals phase-delayed by the phase delaying unit 111 by the first half pattern of the training symbol known in advance, respectively.

The n second group multiplication units 113 multiply the second half of non-phase-delayed OFDM signals by the second half of the training symbol known in advance, respectively.

Figure 4:
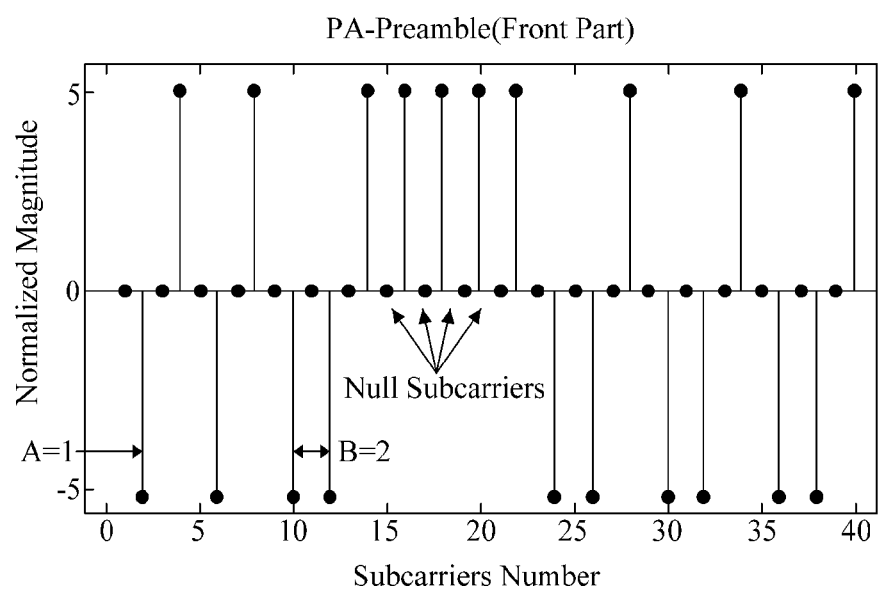
FIG. 4 is an exemplary diagram illustrating an arrangement structure of the subcarriers of the training symbol in the frequency domain.

FIG. 4 is an exemplary diagram illustrating an arrangement structure of the subcarriers of the training symbol in the frequency domain, and describes repetition structures of time domain values according to a method of periodic arrangement of the subcarriers of the training symbol in the frequency domain.

X(k), a frequency domain value of the training symbol, is calculated through an Inverse Fast Fourier Transform (IFFT) to generate x(n), a time domain value of the OFDM signals, as shown in Equation 1.

$$x(n) = \sum_{k=0}^{N-1} X(k)\exp\left(j\frac{2\pi nk}{N}\right) \quad \text{Equation 1}$$

is where X(k), subcarriers of the training symbol, include periodic NULL subcarriers as can be seen in the following Equation 2. Here, A represents the number of NULL subcarriers located in front of a first Non-Zero subcarrier of the training symbol, and B represents an interval between Non-Zero subcarriers.

$$X(k) = \begin{cases} d(k), & k = A + Bk', k' = 0, 1, \ldots, L-1 \\ 0, & \text{otherwise} \end{cases} \quad \text{Equation 2}$$

When X(k) of Equation 2 is substituted into Equation 1, the following Equation 3 is obtained.

$$x(n) = \exp\left(j\frac{A \times 2\pi n}{N}\right) \times \sum_{k'=0}^{N-1} d(k')\exp\left(j\frac{B \times 2\pi nk'}{N}\right) \quad \text{Equation 3}$$

Equation 3 describes why the training symbol has the repetition feature in the time domain. Equation 3 expresses that the same pattern is repeated B times in the training symbol in the time domain and each repetition pattern has a phase difference of $2\pi A/B$.

Figure 2:
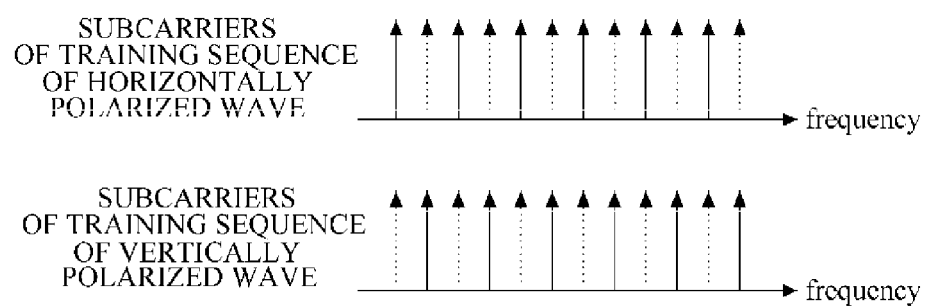
FIG. 2 is an exemplary diagram illustrating a configuration of subcarriers of a training symbol for a polarized antenna.

As illustrated in FIG. 2, the subcarrier of the training symbol of each polarized wave is alternately arranged as the subcarrier of the training symbol of the other polarized wave, and the training symbol of each polarized wave are repeated twice in one OFDM sequence.

The first and second half patterns of the training symbol in the OFDM signals transmitted in one polarized wave have the same phase, and the first and second half patterns of the training symbol in the OFDM signals transmitted in the other polarized wave have opposite phases.

Figure 5:
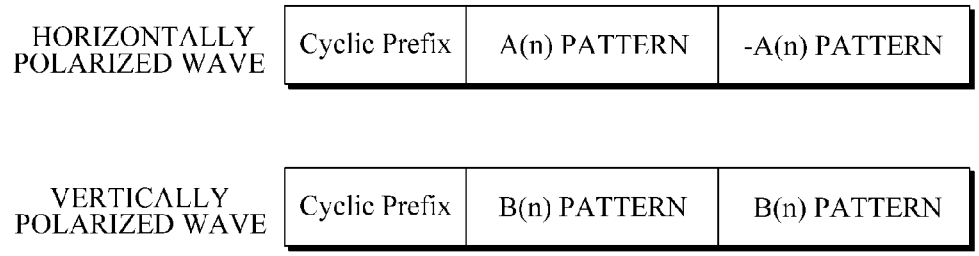
FIG. 5 is a diagram illustrating repetition pattern signal properties of the training symbol in each polarized wave.

FIG. 5 illustrates these repetition pattern properties. FIG. 5 is a diagram illustrating repetition pattern signal properties of the training symbol of each polarized wave. In FIG. 5, in the horizontally polarized wave, the first and second half patterns of the training symbol have is opposite phases, and in the vertically polarized wave, the first and second half patterns of the training symbol have the same phase.

As illustrated in FIG. 5, signal $X_H$ transmitted in the horizontally polarized wave and signal $X_V$ transmitted in the vertically polarized wave are expressed as the following Equations 4.

$$x_H = \begin{cases} A(n), & 0 \le n \le \frac{N}{2} \\ -A(n), & \frac{N}{2} \le n \le N \end{cases} \quad \text{Equation 4}$$

$$x_V = \begin{cases} B(n), & 0 \le n \le \frac{N}{2} \\ B(n), & \frac{N}{2} \le n \le N \end{cases}$$

When a terminal receives the signals illustrated in FIG. 5, by considering effects of carrier frequency offset $\Delta f$ and channel transfer functions $H_{VH}$ and $H_{HV}$ due to XPD (cross-polarization discrimination), receiving signals $Y_H$ and $Y_V$ are expressed as the following Equations 5.

$$y_H = x_H H_{HH} + x_V H_{VH} = \quad \text{Equation 5}$$
$$\begin{cases} A(n) + H_{VH} \times B_{(n)}, & 0 \le n \le \frac{N}{2} \\ \{-A(n) + H_{VH} \times B(n)\}\exp(j\pi\Delta f), & \frac{N}{2} \le n \le N \end{cases}$$

$$y_V = x_V H_{VV} + x_H H_{HV} =$$
$$\begin{cases} B(n) + H_{HV} \times A_{(n)}, & 0 \le n \le \frac{N}{2} \\ \{B(n) + H_{HV} \times -A(n)\}\exp(j\pi\Delta f), & \frac{N}{2} \le n \le N \end{cases}$$

When carrier frequency offset of the receiving signals expressed in Equations 5 is calculated, errors occur due to the summing of signals having different phases in the repetition pattern. In order to address this problem, the n first group multiplication units 112 multiply the first half of the OFDM signals phased-delayed by each of the phase delaying units 111 by the first half pattern of the training symbol known in advance, respectively, and the n second group multiplication units 113 multiply the second half pattern of the non-phase-delayed OFDM signals by the second half pattern of the training symbol known in advance, respectively. In this way, antenna phase shift values due to interference between antennas may be calculated as shown in Equations 6.

$$B(n)y_H + A(n)y_V = \{H_{VH}B^2(n) - H_{HV}A^2(n)\}\exp(j\pi\Delta f), \quad \text{Equations 6}$$
$$\frac{N}{2} \le n \le N$$

$$B(n)y_H - A(n)y_V = H_{VH}B^2(n) - H_{HV}A^2(n), \; 0 \le n \le \frac{N}{2}$$

The offset estimating unit 120 removes phase shifts due to interference between antennas from the antenna phase shift values due to interference between antennas calculated by the phase-shift calculating unit 110, removes the effect of fast fading, and estimates carrier frequency offset values. Meanwhile, the offset estimating unit 120 may include a first phase-shift removing unit 121, a second phase-shift removing unit 122, and a frequency component acquisition unit 123.

The first phase-shift removing unit 121 removes phase shifts due to interference between antennas by adding or subtracting values output from each of the n first group multiplication units 112.

The second phase-shift removing unit 122 removes phase shifts due to interference between antennas by adding or subtracting values output from each of the n second group multiplication units 113.

The frequency component acquisition unit 123 acquires frequency components in which the effect of fast fading is removed by calculating the inverse tangent of signals output from the first and second phase-shift removing units 121 and 122.

A carrier frequency offset value $\Delta f$ estimated by the offset estimating unit 120 is expressed as shown in the following Equations 7.

$$\Delta f = \frac{1}{\pi} \tan^{-1} \left\{ \frac{\text{imag}\{\text{mean}(g(1:\frac{N}{2}))\}}{\text{real}\{\text{mean}(g(\frac{N}{2}+1:N))\}} \right\} \quad \text{Equations 7}$$

$$g(n) = x_V(n) \times y_H(n) - x_H(n) \times y_V(n)$$

In Equations 7, imag is a value of an imaginary part, real is a value of a real part, mean is an average value, and g is a value in which output phase shifts due to interference between antennas are removed by the first and second phase-shift removing units 121 and 122.

When the OFDM training symbol is transmitted and received through the plurality of polarized antennas, properties of the repetition feature are changed due to interference between the horizontally and vertically polarized waves. According to the invention, carrier frequency offset is estimated using this training symbol so that carrier frequency offset used for carrier frequency synchronization acquisition is accurately estimated when there is interference between polarized waves.

Figure 6:
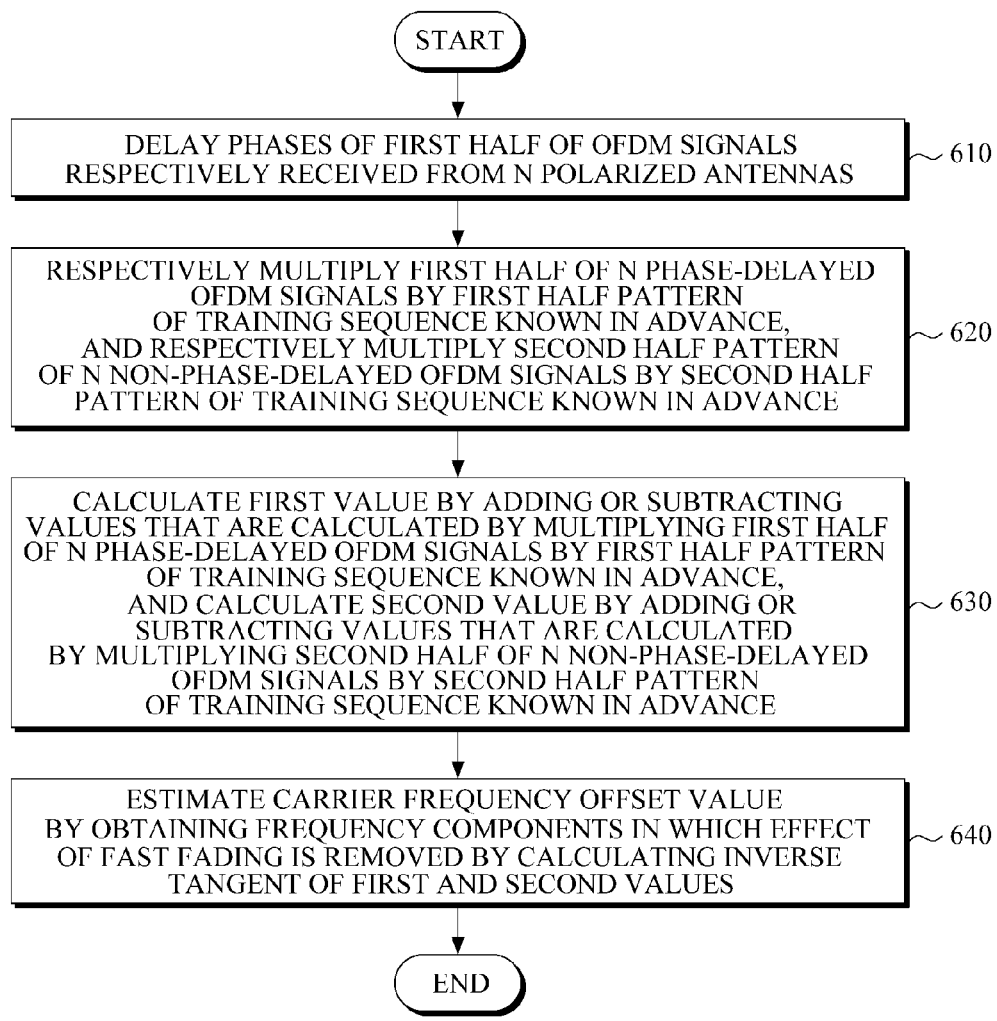
FIG. 6 is a flowchart for describing operations of a method of estimating carrier frequency offset in the device for estimating carrier frequency offset of the OFDM signals transmitted and received through the plurality of polarized antennas according to the embodiment of the invention.

As describe above, estimation operations of carrier frequency offset in the device for estimating carrier frequency offset of the OFDM signals transmitted and received through the plurality of polarized antennas will be descried with reference to FIG. 6. FIG. 6 is a flowchart for describing operations of a method of estimating carrier frequency offset in the device for estimating carrier frequency offset of the OFDM signals transmitted and received through the plurality of polarized antennas according to the embodiment of the invention.

First, in operation 610, the device for estimating carrier frequency offset delays phases of the first half the OFDM signals respectively received from the n polarized antennas. In this case, the polarized antennas may include at least one vertically polarized antenna and at least one horizontally polarized antenna.

Next, in operation 620, the device for estimating carrier frequency offset multiplies the first half of the n phase-delayed OFDM signals by the first half pattern of the training symbol known in advance, and multiplies the second half pattern of the n non-phase-delayed OFDM signals by the second half pattern of the training symbol known in advance.

In this case, the subcarrier of the training symbol of each polarized wave is alternately arranged as the subcarrier of the training symbol of the other polarized wave. Meanwhile, the training symbol of each polarized wave is repeated twice in one OFDM sequence, the first and second half patterns of the training symbol in the OFDM signals transmitted in one polarized wave have the same phase, and the first and second half patterns of the training symbol in the OFDM signals transmitted in the other polarized wave have opposite phases.

Next, in operation 630, the device for estimating carrier frequency offset calculates a first value by adding or subtracting values that are calculated by the first half of the n phase-delayed OFDM signals by the first half pattern of the training symbol known in advance, and calculates a second value by adding or subtracting values that are calculated by the second half of the n non-phase-delayed OFDM signals by the second half pattern of the training symbol known in advance. This has already been described using equations and will not be described again here.

Next, in operation 640, the device for estimating carrier frequency offset estimates a carrier frequency offset value by obtaining frequency components in which the effect of fast fading is removed by calculating the inverse tangent of the first and second values. This has already been described using equations and will not be described again here.

With such a configuration, when the OFDM training symbol is transmitted and received through the plurality of polarized antennas, properties of the repetition feature are changed due to interference between the horizontally and vertically polarized waves. According to the invention, carrier frequency offset is estimated using this training symbol so that carrier frequency offset used for carrier frequency synchronization acquisition is accurately estimated when there is interference between polarized waves.

While exemplary embodiments of the invention have been particularly described in detail with reference to the accompanying drawings, it is apparent that various modifications may be made without departing from the spirit and scope of the invention as defined by the appended claims.

The present invention can be implemented as computer-readable code in a computer-readable recording medium. The computer-readable recording medium includes all types of recording media in which computer-readable data is stored. Examples of the computer-readable recording medium include a ROM, a RAM, a CD-ROM, a magnetic tape, a floppy disk, and an optical data storage. Further, the recording medium may be implemented in the form of carrier waves, such as those used in Internet transmission. In addition, the computer-readable recording medium may be distributed among computer systems over a network such that computer-readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A device for estimating carrier frequency offset of Orthogonal Frequency Division Multiplexing signals transmitted and received through a plurality of polarized antennas, the device comprising:

a phase-shift calculating unit configured to calculate antenna phase shift values of Orthogonal Frequency Division Multiplexing signals respectively received from the plurality of polarized antennas due to interference between antennas; and an offset estimating unit configured to remove phase shifts due to interference between antennas from the antenna phase shift values due to interference between antennas calculated by the phase-shift calculating unit, remove an effect of fast fading, and estimate carrier frequency offset values;

wherein the phase-shift calculating unit includes:

n phase delaying units configured to delay phases of a first half the Orthogonal Frequency Division Multiplexing signals respectively received from n polarized antennas, respectively;

n first group multiplication units configured to respectively multiply a first half of phased-delayed Orthogonal Frequency Division Multiplexing signals respectively phase-delayed by the phase delaying units by a first half pattern of a training symbol known in advance; and n second group multiplication units configured to respectively multiply a second half pattern of non-phase-delayed Orthogonal Frequency Division Multiplexing signals by a second half pattern of the training symbol known in advance.

2. The device according to claim 1, wherein the offset estimating unit includes:
- a first phase-shift removing unit configured to remove phase shifts due to interference between antennas by adding or subtracting values output from each of the n first group multiplication units;
- a second phase-shift removing unit configured to remove phase shifts due to interference between antennas by adding or subtracting values output from each of the n second group multiplication units; and
- a frequency component acquisition unit configured to acquire frequency components in which the effect of fast fading is removed by calculating the inverse tangent of signals output from the first and second phase-shift removing units.

3. The device according to claim 1, wherein the polarized antennas include at least one vertically polarized antenna and at least one horizontally polarized antenna.

4. The device according to claim 1, wherein a subcarrier of the training symbol of each polarized wave is alternately arranged as a subcarrier of the training symbol of another polarized wave.

5. The device according to claim 1, wherein the training symbol of each polarized wave are repeated twice in one Orthogonal Frequency Division Multiplexing sequence, the first and second half patterns of the training symbol in the Orthogonal Frequency Division Multiplexing signals transmitted in one polarized wave have the same phase, and the first and second half patterns of the training symbol in the Orthogonal Frequency Division Multiplexing signals transmitted in the other polarized wave have opposite phases.

6. A method of estimating carrier frequency offset of the device for estimating carrier frequency offset of Orthogonal Frequency Division Multiplexing signals transmitted and received through a plurality of polarized antennas, the method comprising:

delaying phases of a first half of the Orthogonal Frequency Division Multiplexing signals received through each of n polarized antennas;

multiplying a first half of n phase-delayed Orthogonal Frequency Division Multiplexing signals by a first half pattern of a training symbol known in advance, and a second half of n non-phase-delayed Orthogonal Frequency Division Multiplexing signals by a second half pattern of the training symbol known in advance;

calculating a first value by adding or subtracting values that are calculated by multiplying the first half of the n phase-delayed Orthogonal Frequency Division Multiplexing signals by the first half pattern of the training symbol known in advance, and calculating a second value by adding or subtracting values that are calculated by multiplying the second half of the n non-phase-delayed Orthogonal Frequency Division Multiplexing signals by the second half pattern of the training symbol known in advance; and estimating a carrier frequency offset value by acquiring frequency components in which the effect of fast fading is removed by calculating the inverse tangent of the first and second values.

7. The method according to claim 6, wherein the polarized antennas include at least one vertically polarized antenna and at least one horizontally polarized antenna.

8. The method according to claim 6, wherein a subcarrier of the training symbol of each polarized wave is alternately arranged as a subcarrier of the training symbol of another polarized wave.

9. The method according to claim 6, wherein the training symbol of each polarized wave are repeated twice in one Orthogonal Frequency Division Multiplexing sequence, the first and second half patterns of the training symbol in the Orthogonal Frequency Division Multiplexing signals transmitted in one polarized wave have the same phase, and the first and second half patterns of the training symbol in the Orthogonal Frequency Division Multiplexing signals transmitted in the other polarized wave have opposite phases.

* * * * *